United States Patent
Xu et al.

(10) Patent No.: US 7,653,134 B2
(45) Date of Patent: *Jan. 26, 2010

(54) VIDEO CODING USING WAVELET TRANSFORM OF PIXEL ARRAY FORMED WITH MOTION INFORMATION

(75) Inventors: Jizheng Xu, Beijing (CN); Shipeng Li, Princeton, NJ (US); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 927 days.

This patent is subject to a terminal disclaimer.

(21) Appl. No.: 10/901,740

(22) Filed: Jul. 29, 2004

(65) Prior Publication Data

US 2005/0008076 A1 Jan. 13, 2005

Related U.S. Application Data

(62) Division of application No. 09/599,160, filed on Jun. 21, 2000, now Pat. No. 7,023,922.

(51) Int. Cl.
  *H04N 7/12* (2006.01)
  *H04N 11/02* (2006.01)
  *H04N 11/04* (2006.01)
  *H04B 1/66* (2006.01)
(52) U.S. Cl. .............................. 375/240.19
(58) Field of Classification Search ............ 375/240.19
  See application file for complete search history.

(56) References Cited

U.S. PATENT DOCUMENTS

| | | | |
|---|---|---|---|
| 5,592,228 A | 1/1997 | Dachiku et al. | |
| 5,659,363 A | 8/1997 | Wilkinson | |
| 5,777,678 A | 7/1998 | Ogata et al. | |
| 5,982,434 A | 11/1999 | Tong et al. | |
| 5,984,514 A | 11/1999 | Greene et al. | |
| 6,142,035 A | 11/2000 | Babatz et al. | |
| 6,222,941 B1 | 4/2001 | Zandi et al. | |
| 6,233,357 B1 | 5/2001 | Li et al. | |
| 6,501,859 B1 | 12/2002 | Kajiwara | |
| 6,567,081 B1 | 5/2003 | Li et al. | |

(Continued)

*Primary Examiner*—Nhon T Diep
(74) *Attorney, Agent, or Firm*—Lee & Hayes, PLLC

(57) ABSTRACT

A video encoding system and method utilizes a three-dimensional (3-D) wavelet transform and entropy coding that utilize motion information in a way to reduce the sensitivity to motion. In one implementation, the coding process initially estimates motion trajectories of pixels in a video object from frame to frame in a video sequence to account for motion of the video object throughout the frames. After motion estimation, a 3-D wavelet transform is applied in two parts. First, a temporal 1-D wavelet transform is applied to the corresponding pixels along the motion trajectories in a time direction. The temporal wavelet transform produces decomposed frames of temporal wavelet transforms, where the spatial correlation within each frame is well preserved. Second, a spatial 2-D wavelet transform is applied to all frames containing the temporal wavelet coefficients. The wavelet transforms produce coefficients within different sub-bands. The process then codes wavelet coefficients. In particular, the coefficients are assigned various contexts based on the significance of neighboring samples in previous, current, and next frame, thereby taking advantage of any motion information between frames. The wavelet coefficients are coded independently for each sub-band to permit easy separation at a decoder, making resolution scalability and temporal scalability natural and easy. During the coding, bits are allocated among sub-bands according to a technique that optimizes rate-distortion characteristics.

25 Claims, 8 Drawing Sheets

U.S. PATENT DOCUMENTS

| | | | |
|---|---|---|---|
| 6,597,739 B1 * | 7/2003 | Li et al. .................. 375/240.19 |
| 6,671,413 B1 | 12/2003 | Pearlman et al. |
| 6,674,911 B1 | 1/2004 | Pearlman et al. |
| 6,778,709 B1 | 8/2004 | Taubman |
| 2001/0024530 A1 | 9/2001 | Fukuhara et al. |
| 2003/0072367 A1 | 4/2003 | Okuno et al. |
| 2004/0028138 A1 | 2/2004 | Piche et al. |

* cited by examiner

VIDEO CODING USING WAVELET TRANSFORM OF PIXEL ARRAY FORMED WITH MOTION INFORMATION

RELATED APPLICATION(S)

This is a divisional of U.S. patent application Ser. No. 09/599,160, entitled "Video Coding System and Method Using 3-D Discrete Wavelet Transform and Entropy Coding With Motion Information", which was filed Jun. 21, 2000, and is assigned to Microsoft Corporation.

TECHNICAL FIELD

This invention relates to systems and methods for video coding. More particularly, this invention relates to systems and methods that employ wavelet transforms for video coding.

BACKGROUND

Efficient and reliable delivery of video data is becoming increasingly important as the Internet continues to grow in popularity. Video is very appealing because it offers a much richer user experience than static images and text. It is more interesting, for example, to watch a video clip of a winning touchdown or a Presidential speech than it is to read about the event in stark print.

With the explosive growth of the Internet and fast advance in hardware technologies and software developments, many new multimedia applications are emerging rapidly. Although the storage capability of the digital devices and the bandwidth of the networks are increasing rapidly, video compression still plays an essential role in these applications due to the exponential growth of the multimedia contents both for leisure and at work. Compressing video data prior to delivery reduces the amount of data actually being transferred over the network. Image quality is lost as a result of the compression, but such loss is generally tolerated as necessary to achieve acceptable transfer speeds. In some cases, the loss of quality may not even be detectable to the viewer.

Many emerging applications require not only high compression efficiency from the various coding techniques, but also greater functionality and flexibility. For example, in order to facilitate contend-based media processing, retrieval and indexing, and to support user interaction, object-based video coding is desired. To enable video delivery over heterogeneous networks (e.g., the Internet) and wireless channels, error resilience and bit-rate scalability are required. To produce a coded video bitstream that can be used by all types of digital devices, regardless their computational, display and memory capabilities, both resolution scalability and temporal scalability are needed.

One common type of video compression is the motion-compensation-based video coding scheme, which is employed in essentially all compression standards such as MPEG-1, MPEG-2, MPEG-4, H.261, and H.263. Such video compression schemes use predictive approaches that encode information to enable motion prediction from one video frame to the next.

Unfortunately, these conventional motion-compensation-based coding systems, primarily targeted for high compression, fail to provide new functionalities such as scalability and error robustness. The recent MPEG-4 standard adopts an object-based video coding scheme to enable user interaction and content manipulation, but the scalability of MPEG-4 is very limited. Previously reported experiments with MPEG-2, MPEG-4, and H.263 indicate that the coding efficiency generally loses 0.5-1.5 dB with every layer, compared with a monolithic (non-layered) coding scheme. See, for example, B. G. Haskell, A. Puri and A. N. Netravali, *Digital Video: An Introduction to MPEG-2*, Chapman & Hall, New York, 1997; and L. Yang, F. C. M. Martins, and T. R. Gardos, "Improving H.263+ Scalability Performance for Very Low Bit Rate Applications," In *Proc. Visual Communications and Image Processing*, San Jose, Calif., January 1999, SPIE.

Since these standard coders are all based on a predictive structure, it is difficult for the coding schemes to achieve efficient scalability due to the drift problem associated with predictive coding. Currently, there are proposals for MPEG-4 streaming video profile on fine granularity scalable video coding. However, these proposals are limited to provide flexible rate scalability only and the coding efficiency is still much lower than that of non-layered coding schemes.

An alternative to predictive-based video coding schemes is three dimensional (3-D) wavelet video coding. One advantage of 3-D wavelet coding over predictive video coding schemes is the scalability (including rate, PSNR, spatial, and temporal), which facilitates video delivery over heterogeneous networks (e.g., the Internet) and future wireless video services. However, conventional 3-D wavelet coding does not use motion information that is proven to be very effective in predictive coders in terms of removing temporal redundancy. Although the computationally intensive motion estimation is avoided, the performance of 3D wavelet video coding remains very sensitive to the motion. Without motion information, motion blur occurs due to a temporal averaging effect of several frames. In addition, most 3-D wavelet video coders do not support object-based functionality, which is needed in the next generation multimedia applications.

Accordingly, there is a need for an efficient 3-D wavelet transform for video coding that employs motion information to reduce the sensitivity to motion and remove the motion blur in the resulting video playback. Additionally, an improved 3-D wavelet transform should support object-based functionality.

SUMMARY

A video encoding system and method utilizes a three-dimensional (3-D) wavelet transform and entropy coding that utilize motion information in a way to reduce the sensitivity to motion and remove any motion blur in the resulting video playback.

In one implementation, the video encoding process initially estimates motion trajectories of pixels in a video object from frame to frame in a video sequence. The motion estimation accounts for motion of the video object throughout the frames, effectively aligning the pixels in the time direction. The motion estimation may be accomplished by matching corresponding pixels in the video object from frame to frame.

After motion estimation, a 3-D wavelet transform is applied in two parts. First, a temporal 1-D wavelet transform is applied to the corresponding pixels along the motion trajectories in a time direction. The temporal wavelet transform produces decomposed frames of temporal wavelet transforms, where the spatial correlation within each frame is well preserved. Second, a spatial 2-D wavelet transform is applied to all frames containing the temporal wavelet coefficients. The wavelet transforms produce coefficients within different sub-bands.

The process then codes wavelet coefficients. In particular, the coefficients are assigned various contexts based on the significance of neighboring samples in previous, current, and next frame, thereby taking advantage of any motion information between frames. The wavelet coefficients are coded independently for each sub-band to permit easy separation at a decoder, making resolution scalability and temporal scalability natural and easy. During the coding, bits are allocated among sub-bands according to a technique that optimizes rate-distortion characteristics. In one implementation, the number of bits are truncated at points in a rate-distortion curve that approximates a convex hull of the curve.

DETAILED DESCRIPTION

This disclosure describes a video coding scheme that utilizes a three-dimensional (3-D) wavelet transform and coding scheme that is suitable for object-based video coding. The 3-D wavelet transform uses motion trajectories in the temporal direction to obtain more efficient wavelet decomposition and to reduce or remove the motion blurring artifacts for low bit-rate coding.

The 3-D wavelet transformation produces coefficients within different sub-bands. An entropy coder is employed to code each sub-band independently in a manner that takes advantage of the motion information. The entropy coder also uses rate-distortion curves to optimize the bit-allocation among sub-bands. Given these attributes, the entropy coder process may be referred to as "Embedded Sub-band Coding with Optimized Truncation" (or short handedly as "ESCOT"). The entropy coder outputs independent embedded bitstreams for each sub-band that meet scalability requirements of new multimedia applications.

Accordingly, unlike conventional 3-D wavelet coding schemes, motion information is used for both 3-D shape adaptive wavelet transforms and the entropy coding. The proposed coding scheme has comparable coding efficiency with MPEG4, while having more functionalities and flexibility, such as, flexible rate scalability, spatial scalability, and temporal scalability. This makes the coding scheme very suitable for numerous applications like video streaming, interactive multimedia applications, and video transmission over wireless channels.

The coding scheme is described in the context of delivering video data over a network, such as the Internet or a wireless network. However, the video coding scheme has general applicability to a wide variety of environments.

Exemplary System Architecture

Figure 1:
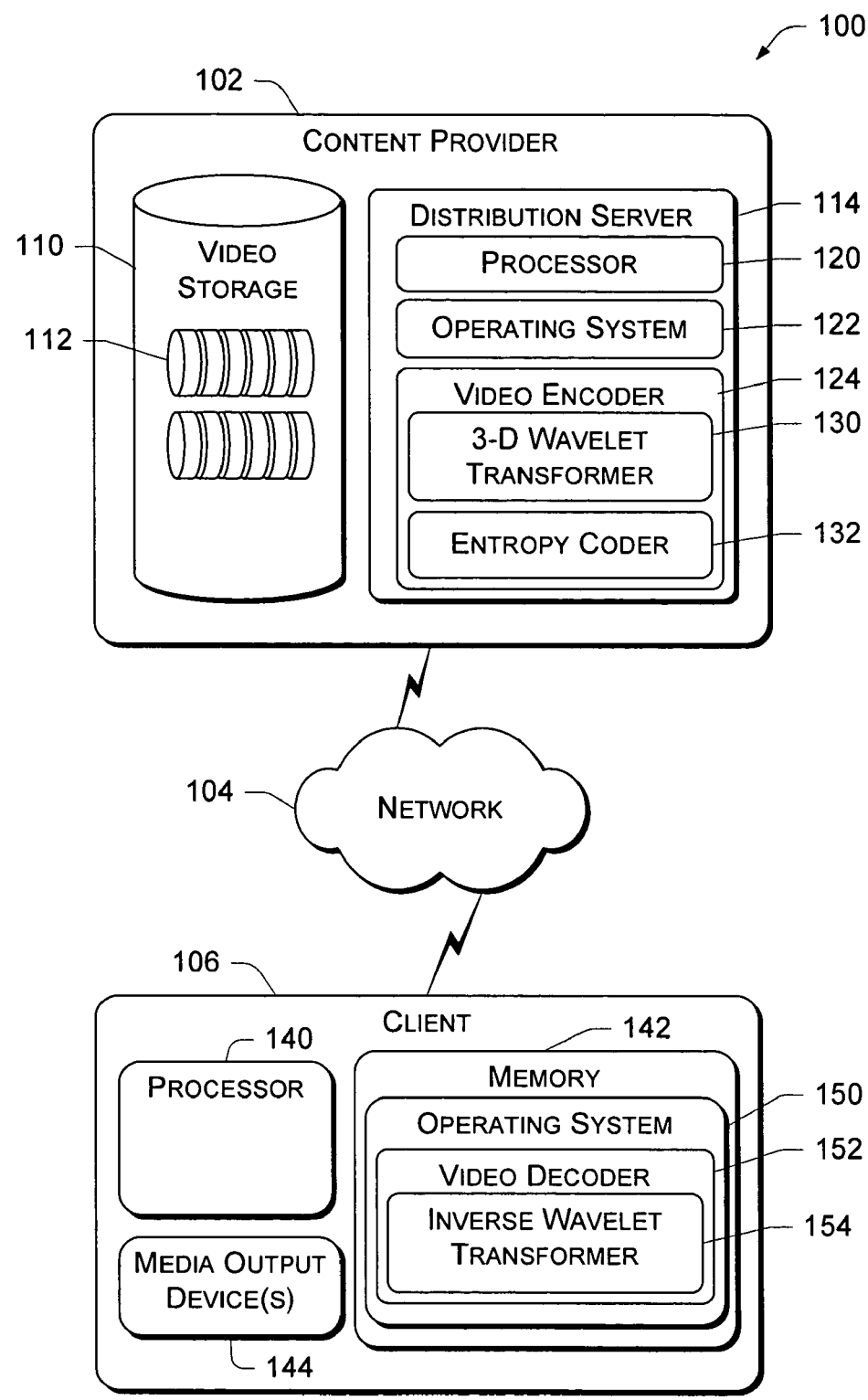
FIG. 1 is a block diagram of a video distribution system, including a video encoder at a content producer/provider and a video decoder at a client.

FIG. 1 shows a video distribution system 100 in which a content producer/provider 102 produces and/or distributes video over a network 104 to a client 106. The network 104 is representative of many different types of networks, including cable, the Internet, a LAN (local area network), a WAN (wide area network), a SAN (storage area network), and wireless networks (e.g., satellite, cellular, RF, microwave, etc.).

The content producer/provider 102 may be implemented in many ways, including as one or more server computers configured to store, process, and distribute video data. The content producer/provider 102 has a video storage 110 to store digital video files 112 and a distribution server 114 to encode the video data and distribute it over the network 104. The server 104 has one or more processors 120, an operating system 122 (e.g., Windows NT, Unix, etc.), and a video encoder 124. The video encoder 124 may be implemented in software, firmware, and/or hardware. The encoder is shown as a separate standalone module for discussion purposes, but may be constructed as part of the processor 120 or incorporated into operating system 122 or other applications (not shown).

The video encoder 124 encodes the video data stored as files 112 using a 3-D wavelet transformer 130 and codes the resulting coefficients using an entropy coder 132. In one implementation, the 3-D wavelet transformer 130 implements a shape-adaptive discrete wavelet transform (SA-DWT), which is an efficient wavelet transform for arbitrarily shaped visual objects. With SA-DWT, the number of coefficients after SA-DWT is identical to the number of pixels in an original arbitrarily shaped visual object. In addition, SA-DWT preserves the spatial correlation, locality properties of wavelet transforms, and self-similarity across sub-bands. It is noted, however, that aspects of this invention may be implemented using other types of wavelet transforms.

The video encoder 124 utilizes motion information in the temporal direction of the video sequence. A motion trajectory for each pixel inside a video object is traced from frame-to-frame using one of a variety of motion estimation processes. Then, a one-dimensional (1-D) SA-DWT is performed along each motion trajectory in the time direction to produce temporally decomposed frames of wavelet coefficients. After temporal decomposition, a spatial two-dimensional (2-D) SA-DWT is applied to all temporally decomposed frames.

The 3-D (i.e., 1-D temporal and 2-D spatial) wavelet transform solves two problems. First, it can handle arbitrarily shaped video objects while having flexible bit-rate, spatial, and temporal scalabilities as in most wavelet-based coding schemes. Secondly, the 3-D wavelet transform tracks the video object motion and performs the wavelet transform among corresponding pixels for that object while keeping the spatial correlation within a frame. Thus, it will efficiently decompose the video-object sequence and more efficient compression is feasible.

After the wavelet transform, the entropy coder 132 codes the coefficients of each sub-band independently. The coder assigns various contexts to the coefficients based on data regarding neighboring samples in the previous, current, and next frames. This context assignment thus takes advantage of the motion information between frames. The coded bitstreams for each sub-band are subsequently combined to form a final bitstream that satisfies scalability requirements. In one implementation, the coded bitstreams are combined using a multi-layer bitstream construction technique.

The client 106 may be embodied in many different ways, including as a computer, a handheld device, a set-top box, a television, a game console, information appliance, wireless communication device, and so forth. The client 106 is equipped with a processor 140, a memory 142, and one or more media output devices 144. The memory 142 stores an operating system 150 (e.g., a Windows-brand operating system) that executes on the processor 140.

The operating system 150 implements a client-side video decoder 152 to decode the video stream. The decoder employs an inverse wavelet transformer 154 to decode the video stream. Following decoding, the client stores the video in memory 142 and/or plays the video via the media output devices 144.

Coding Process

Figure 2:
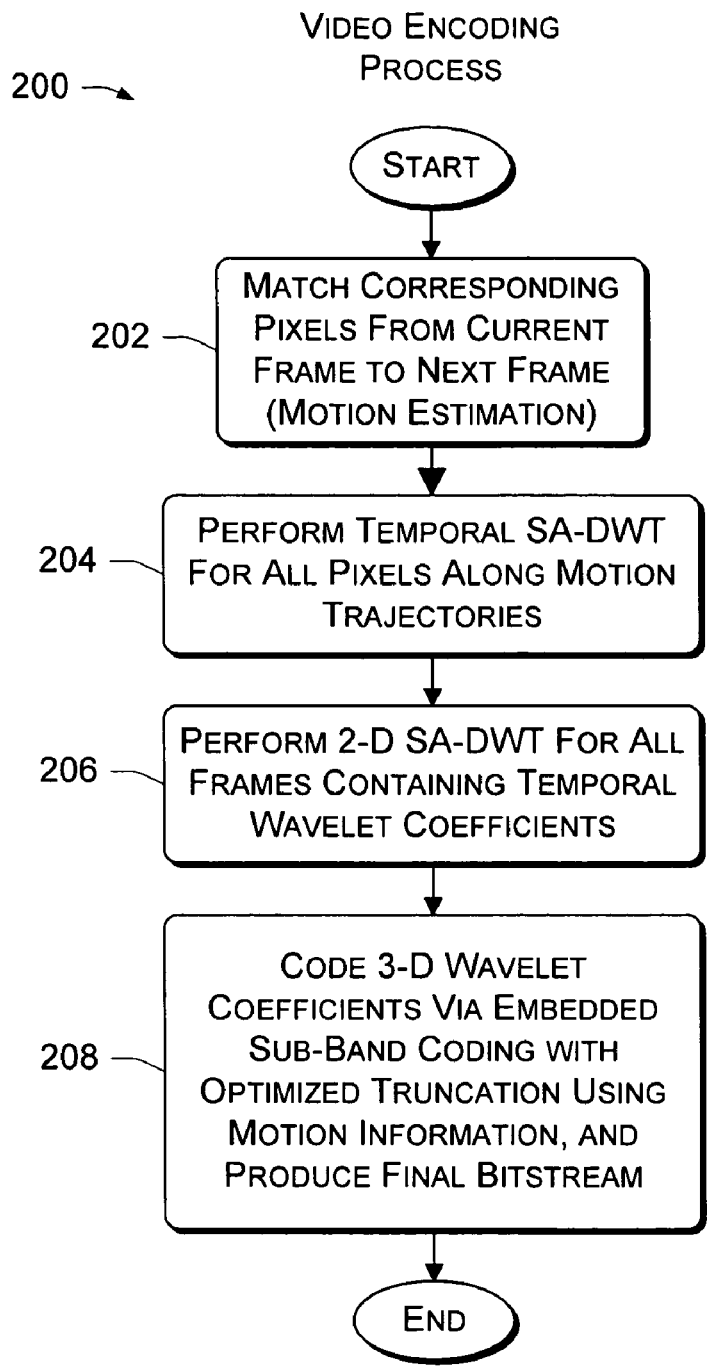
FIG. 2 is a flow diagram of a video coding process using three-dimensional shape-adaptive discrete wavelet transforms and motion estimation information.

FIG. 2 shows a video coding process 200 for coding video objects. The process 200 may be implemented, for example, by the video encoder 124 in the content producer/provider 102. The process may be implemented as computer-readable instructions stored in a computer-readable medium (e.g., memory, transmission medium, etc.) that, when executed, perform the operations illustrated as blocks in FIG. 2.

At block 202, the video encoder estimates motion trajectories of pixels in a video object from frame to frame in a video sequence to account for motion of the video object throughout the frames. In one implementation, the video encoder uses a pixel matching process to match corresponding pixels from frame-to-frame in the temporal direction. The matching operation traces motion trajectories for the corresponding pixels, thereby aligning the pixels in the temporal direction. It is noted that other motion estimation schemes may be used instead of the pixel matching process.

At block 204, the video encoder uses the wavelet transformer 130 to perform a wavelet transform on the corresponding pixels in the time dimension along the motion trajectories. In one implementation, the transformer uses a temporal 1-D shape-adaptive discrete wavelet transform (SA-DWT) for the corresponding pixels. The temporal wavelet transform produces decomposed frames of temporal wavelet transforms, where the spatial correlation within each frame is well preserved.

At block 206, the wavelet transformer 130 applies a spatial 2-D shape-adaptive discrete wavelet transform for all frames containing the temporal wavelet coefficients (block 206). The wavelet transforms produce coefficients within different sub-bands. The 3-D SA-DWTs of blocks 204 and 206 are explored in more detail below under the heading "3-D SA-DWT (Blocks 204 and 206)".

At block 208, the entropy coder 132 codes the wavelet coefficients independently for each sub-band and optimizes the bits allocated to each sub-band. The entropy coder 132 outputs a bitstream of independently coded sub-bands. The entropy encoding operation is described below in more detail under the heading "ESCOT (Block 208)".

3-D SA-DWT (Blocks 204 and 206)

As shown in operation 202 of FIG. 2, the video encoder initially constructs a 1-D array of corresponding pixels obtained from motion estimation (e.g., pixel-matching scheme) to identify corresponding pixels from frame to frame. The motion estimation aligns the pixels the temporal direction.

Figure 3:
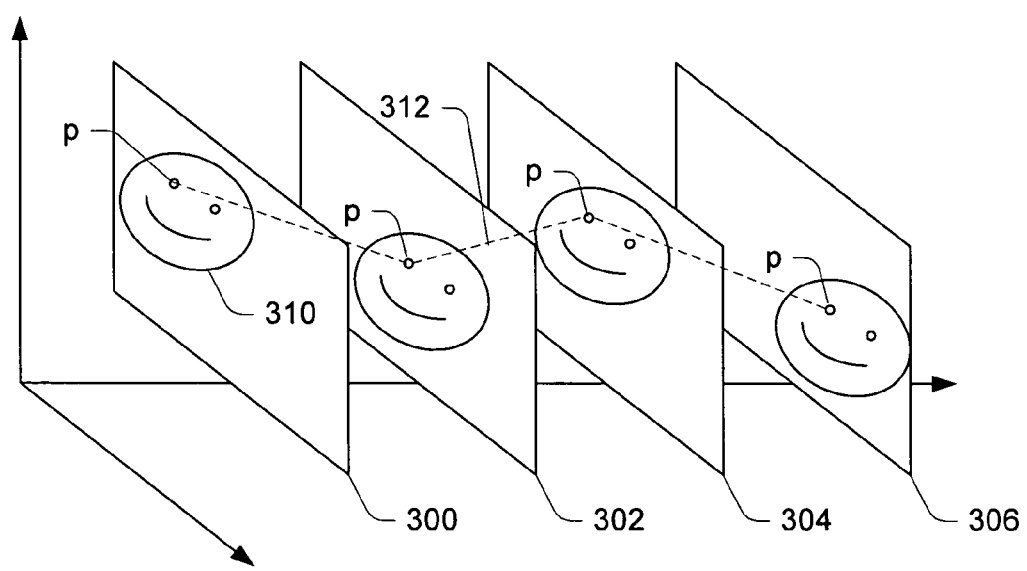
FIG. 3 illustrates four frames in a video sequence to demonstrate motions estimation of pixels from frame to frame.

FIG. 3 shows four frames 300, 302, 304, and 306 plotted along the time dimension. Each frame has a video object 310 in the form of a "smiley face" that moves from frame to frame. Consider a pixel "p" used to form an eye in the smiley face object 310. The first task prior to transformation is to match the pixel p in each frame to account for motion of the object. The corresponding pixels from frame-to-frame are linked by line 312.

After the 1-D array of corresponding pixels is built, the wavelet transformer 130 at content provider 102 performs a temporal decomposition along the motion trajectories. More specifically, the transformer 130 applies a 1-D shape-adaptive discrete wavelet transform to the 1-D array to obtain a 1-D coefficient array. The coefficients in the 1-D array are then redistributed to their corresponding spatial position in each frame.

A video object normally is not limited to 2-D translation movement within a frame, but may move in/out or zoom in/out of a video scene any time. This gives rise to four separate cases of pixel transitions from frame to frame.

Figure 4:
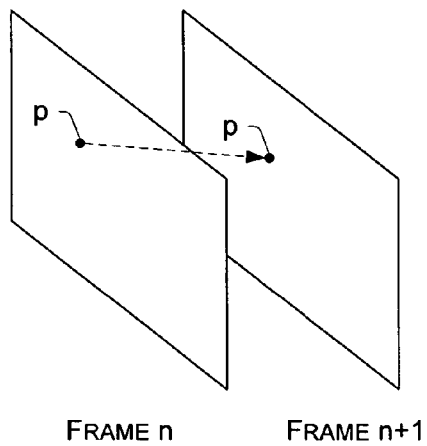
FIG. 4 illustrates two consecutive frames and demonstrates a case where a pixel continues from one frame to the next.

Case 1: Continuing pixels. This is the normal case as pixels continue in one-to-one correspondence between two consecutive frames. In this case, the temporal 1-D pixel array is extended to include the corresponding pixel from the next frame. FIG. 4 illustrates the continuing pixel case, where a pixel p continues from one frame n to a next frame n+1.

Figure 5:
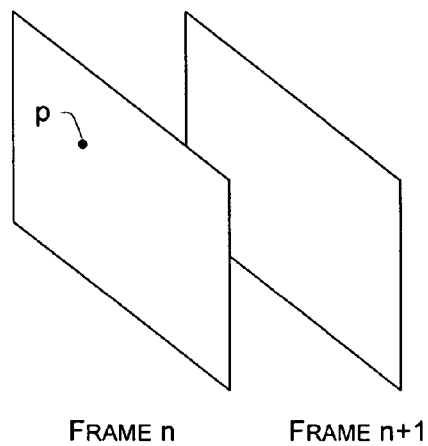
FIG. 5 illustrates two consecutive frames and demonstrates a case where a pixel terminates in a current frame and does not continue to the next frame.

Case 2: Terminating pixels. This case represents pixels that do not carry to the next frame, and hence no corresponding pixels can be found in the next frame. In this case, the temporal 1-D pixel array is ended at the terminating pixel. FIG. 5 illustrates the terminating pixel case, where a pixel p ends in frame n and cannot be found in the next frame n+1.

Figure 6:
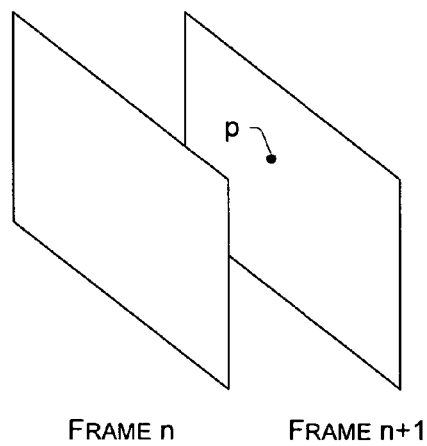
FIG. 6 illustrates two consecutive frames and demonstrates a case where a pixel emerges in the next frame, but does not appear in the current frame.

Case 3: Emerging pixels. This case represents pixels that originate in the next frame and have no corresponding pixels in the previous frame. In this case, the emerging pixel will start a new temporal 1-D pixel array. FIG. 6 illustrates the emerging pixels case, where a new pixel p originates in frame n+1 and has no corresponding pixel in preceding frame n.

Figure 7:
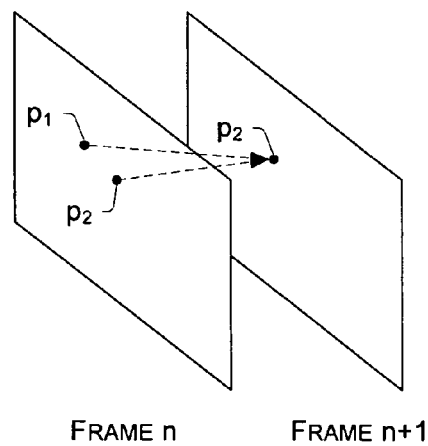
FIG. 7 illustrates two consecutive frames and demonstrates a case where to pixels in the current frame collide at one pixel in the next frame.

Case 4: Colliding pixels. This case represents pixels that have more than one corresponding pixel in a previous frame. In this case, the colliding pixel will be assigned to only one of the corresponding pixels in the previous frame, and all the other corresponding pixels are marked as terminating pixels. FIG. 7 illustrates the colliding pixels case, where pixels $p_1$ and $p_2$ in frame n both correspond to a pixel in next frame n+1. Here, pixel $p_1$ is designated as a terminating pixel, thereby ending the 1-D pixel array containing that pixel. Pixel $p_2$ is a continuing pixel that is added to the ongoing 1-D pixel array for that pixel.

Figure 8:
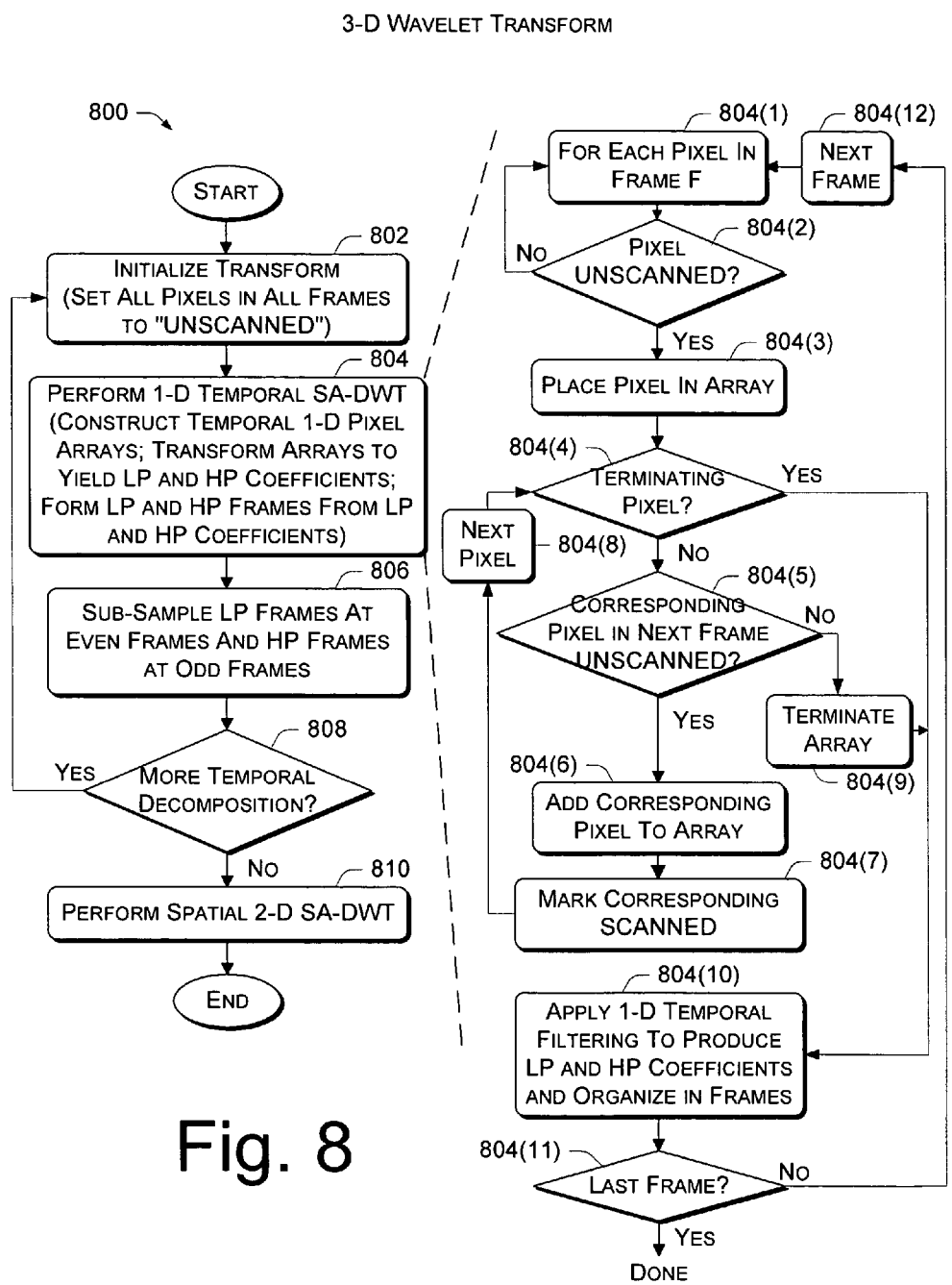
FIG. 8 is a flow diagram of a 3-D wavelet transform process applied to video frames.

FIG. 8 shows the 3-D wavelet transformation process 800 for a video sequence. The process 800 may be implemented by the wavelet transformer 130 at the video encoder 124. The operations depicted as blocks may be embodied as computer-executable instructions embodied on computer readable media (e.g., storage media, communications media, etc.).

Given a group of pictures/frames $F_i$, for i=0, ..., N−1, it is assumed that the motion of each pixel with reference to the next frame has been obtained using a motion estimation, for example, a block-based motion estimation algorithm. For each block in frame i that contains pixels from the video object, a search for the best-matched block in frame i+1 is made and the motion vector for that block is estimated. For purposes of 3-D SA-DWT, the motion vector of every pixel within a block is set to the same as that of the block. Other motion estimation techniques may be used.

After motion estimation, each pixel in the current frame may represent one of the four cases described above: continuing pixels, terminating pixels, emerging pixels, and colliding pixels. Additionally, all pixels in the last frame $F_{N-1}$ are terminating pixels since there is no "next" frame. For discussion purposes, assume that the wavelet transformer 130 employs odd-symmetric bi-orthogonal wavelet filters, although other types of wavelet filters can also be used.

At block 802, the transformer 130 initializes the 3-D shape-adaptive discrete wavelet transform. In our example, counter value "i" is set to 0 and all pixels within an object boundary in all N frames are marked as UNSCANNED.

At block 804, the wavelet transformer 130 performs 1-D temporal SA-DWT on the frames. This operation includes constructing temporal 1-D pixel arrays, transforming those arrays to produce low-pass (LP) and high-pass (HP) coefficients, and organizing LP and HP coefficients into low-pass and high-pass frames.

One preferred implementation of the 1-D temporal SA-DWT is illustrated as blocks 804(1)-804(12). The transform operation (block 804) loops through every pixel in every frame of the video sequence. Block 804(1) represents this iterative process as being for every pixel $p_i(x_i,y_i)$ within object boundary in frame $F_i$. At block 804(2), the pixel is examined to see if it is marked as UNSCANNED. If not, the pixel has already been considered and the process proceeds to the next pixel at block 804(1). Otherwise, assuming the pixel is still marked UNSCANNED (i.e., the "yes" branch from block 804(2)), the pixel becomes the first pixel of a new temporal 1-D pixel array (block 804(3)). Essentially, this pixel represents the emerging pixel case where it is the first pixel to originate in a frame.

The inner loop of operations consisting of blocks 804(4)-804(9) evaluate whether the pixels are continuing pixels, thereby growing the pixel array, or terminating pixels that end the array. At block 804(4), the pixel is evaluated to determine whether it is a terminating pixel, meaning that there is no corresponding pixel in the next frame. Introducing "j" as a new counter equal to "i", if pixel $p_j(x_j,y_j)$ is a terminating pixel, it is the last pixel in the temporal 1-D array and hence the array is ready for transformation at block 804(9) (described below).

Conversely, if pixel $p_j(x_j,y_j)$ is not a terminating pixel (i.e., the "no" branch from block 804(4)), the process evaluates whether the corresponding pixel $p_{j+1}(x_{j+1}, y_{j+1})$ in frame $F_{j+1}$ is marked as UNSCANNED, where $(x_{j+1}, y_{j+1})=(x+mv_x, y+mv_y)$ and $(mv_x, mv_y)$ is the motion vector from pixel $p_j(x_j, y_j)$ in frame $F_j$ to its corresponding pixel $p_{j+1}(x_{j+1}, y_{j+1})$ in frame $F_{j+1}$ (block 804(5)). If the corresponding pixel $p_{j+1}(x_{j+1}, y_{j+1})$ is UNSCANNED (i.e., the "yes" branch from block 804(5)), the corresponding pixel $p_{j+1}(x_{j+1}, y_{j+1})$ is added as the next pixel in the 1-D pixel array (block 804(6)). This situation represents the continuing pixel case (FIG. 4) in which consecutive pixels are added to the temporal 1-D array. The corresponding pixel $p_{j+1}(x_{j+1}, y_{j+1})$ is then marked as SCANNED to signify that it has been considered (block 804(7)). Process continues with consideration of the next corresponding pixel $p_{j+2}(x_{j+2}, y_{j+2})$ in the next frame $F_{j+2}$ (block 802(8)).

On the other hand, as indicated by the "no" branch from block 804(5), the corresponding pixel $p_{j+1}(x_{j+1}, y_{j+1})$ may have already been marked as SCANNED, indicating that this pixel also corresponded to at least one other pixel that has already been evaluated. This represents the colliding pixel case illustrated in FIG. 7. In this case, the subject pixel $p_j(x_j, y_j)$ in frame $F_j$ will terminate the 1-D pixel array (block 804(9)).

At block 802(10), the transformer applies 1-D arbitrary length wavelet filtering to each terminated 1-D pixel array. This operation yields a transformed low-pass thread of coefficients $L_k(x_k,y_k)$, k=i, . . . , j−1, and a transformed high-pass thread of coefficients $H_k(x_k,y_k)$, k=i, . . . , j−1. The low-pass coefficients $L_k(x_k,y_k)$ are organized into a low-pass frame k at position $(x_k,y_k)$ and the high-pass coefficients $H_k(x_k,y_k)$ are organized into a high-pass frame k at position $(x_k,y_k)$. Isolated pixels can be scaled by a factor (e.g., square root of 2) and put back into their corresponding positions in both low-pass and high-pass frames.

At block 804(11), the process evaluates whether this is the last frame. If not, the process continues with the next frame $F_{i+1}$ (block 804(12)).

At block 806, the low-pass frames are sub-sampled at even frames to obtain temporal low-pass frames and the high-pass frames are sub-sampled at odd frames to obtain temporal high-pass frames. If more temporal decomposition levels are desired (i.e., the "yes" branch from block 808), the operations of blocks 802-806 are repeated for the low-pass frames. Note that the motion vectors from frame $F_k$ to $F_{k+2}$ can be obtained by adding the motion vectors from $F_k$ to $F_{k+1}$ and $F_{k+1}$ to $F_{k+2}$.

Following the temporal transform, at block 810, the transformer 130 performs spatial 2-D SA-DWT transforms according to the spatial shapes for every temporally transformed frame. This is essentially the same operation illustrated as block 206 in FIG. 2.

ESCOT (Block 208)

After wavelet transformation, the resulting wavelet coefficients are coded using a powerful and flexible entropy coding process called ESCOT (Embedded Sub-band Coding with Optimized Truncation) that uses motion information. The entropy coding technique used in ESCOT is similar to the EBCOT (Embedded Block Coding with Optimized Truncation) for still images, which was adopted in JPEG-2000. However, unlike EBCOT, the ESCOT coding scheme is designed for video content and employs a set of coding contexts that make it very suitable for scalable video object compression and the 3D SA-DWT described above, and that take into account motion information between frames. The ESCOT coding scheme is implemented, for example, by the entropy coder 132 of video encoder 124 (FIG. 1).

The ESCOT coding scheme can be characterized as two main stages: (1) sub-band or entropy coding and (2) bitstream construction. These two stages are described separately below.

Stage 1: Sub-Band Coding

Figure 9:
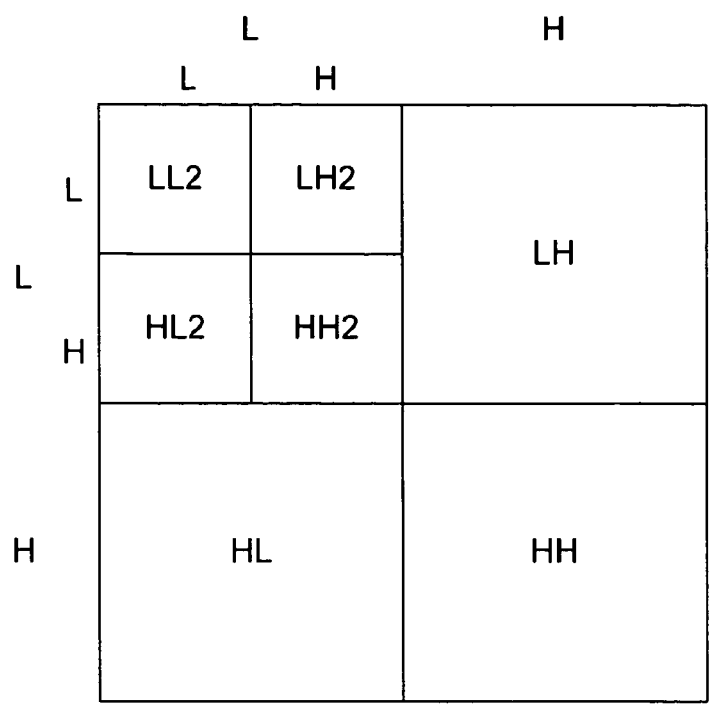
FIG. 9 illustrates sub-bands within a video frame that are formed by the wavelet transform.

As explained above, the 3-D wavelet transform produces multiple sub-bands of wavelet coefficients. The spatial 2-D wavelet transform decomposes a frame in the horizontal direction and in the vertical direction to produce four sub-bands: a low-low (LL) sub-band, a high-low (HL) sub-band, a low-high (LH) sub-band, and a high-high (HH) sub-band. FIG. 9 shows the four sub-bands from the spatial 2-D wavelet transform. The LL sub-band typically contains the most interesting information. It can be decomposed a second time to produce sub-sub-bands within the LL sub-band, as depicted by bands LL2, LH2, HL2, and HH2.

The ESCOT coding scheme codes each sub-band independently. This is advantageous in that each sub-band can be decoded independently to achieve flexible spatial and temporal scalabilities. A user can mix arbitrary number of spatio-temporal sub-bands in any order to obtain the desired spatial and temporal resolution. Another advantage is that rate-distortion optimization can be done among sub-bands, which may improve compression efficiency.

Figure 10:
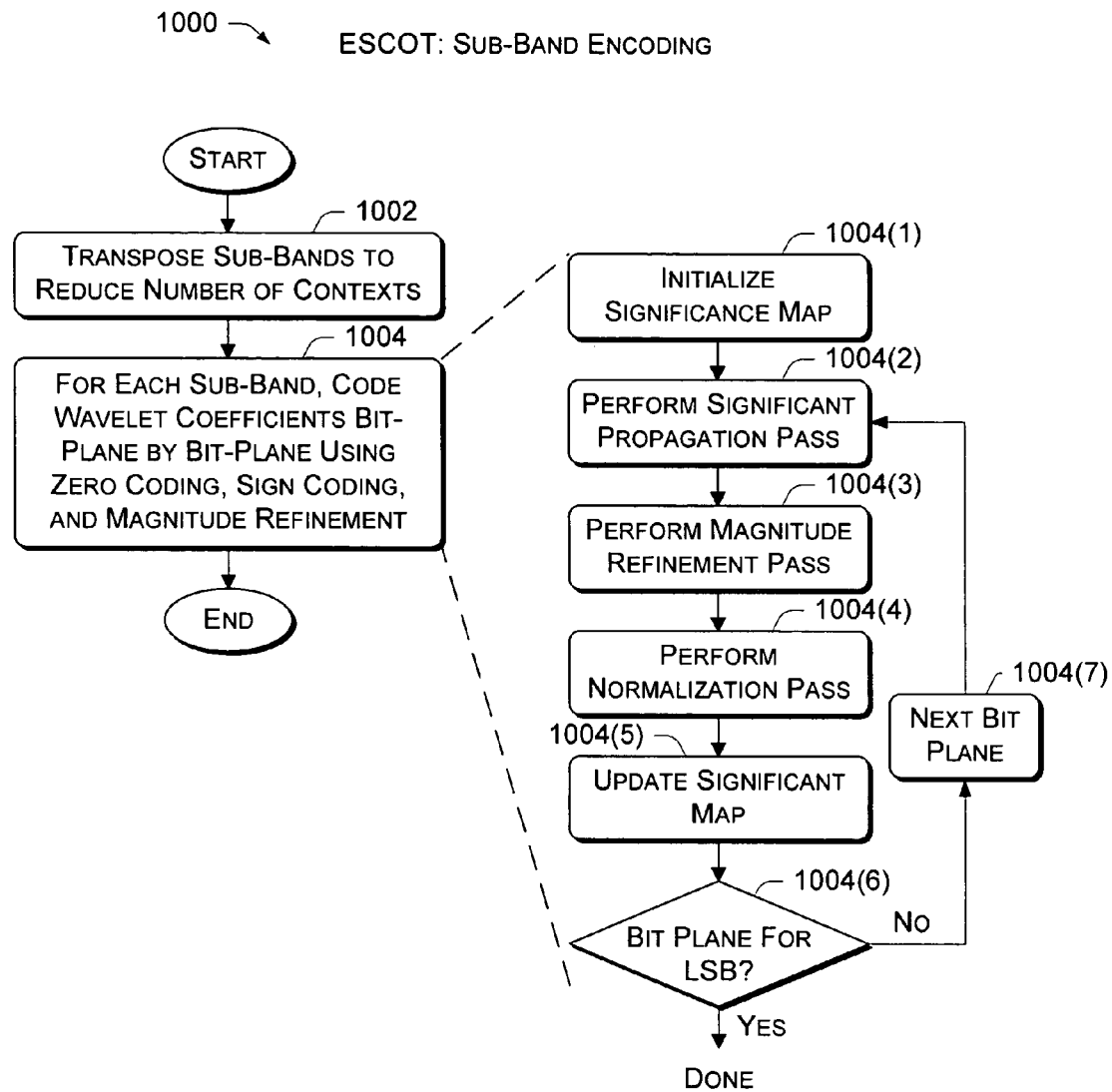
FIG. 10 is a flow diagram of a sub-band encoding process.

FIG. 10 shows the sub-band coding process 1000, which is implemented by the entropy coder 132. The process may be implemented as computer-readable instructions that, when executed, perform the operations identified in the sub-band coding process 1000.

At block 1002, the number of contexts used in the coding is reduced by exploiting the symmetric property of wavelet sub-bands through transposition of selected sub-bands. Transposing allows certain sub-bands to share the same context. For example, the LLH sub-band, HLL sub-band, and LHL sub-band that are produced from the 3-D transform can share the same contexts and coding scheme if the HLL and LHL sub-bands are transposed to have the same orientation as the LLH sub-band before encoding. After sub-band transposition, four classes of sub-bands remain: LLL, LLH, LHH and HHH.

At block 1004, for each sub-band, the quantized coefficients are coded bit-plane by bit-plane. In a given bit-plane, different coding primitives are used to code a sample's information of this bit-plane. The coding primitives take into account motion information by examining neighboring samples in previous, current, and next frames and determining the significant of these neighboring samples.

In one implementation, there are three coding primitives: zero coding (ZC), sign coding (SC) and magnitude refinement (MR). The zero and sign coding primitives are used to code new information for a single sample that is not yet significant in the current bit-plane. Magnitude refinement is used to code new information of a sample that is already significant. Let $\sigma[i,j,k]$ be a binary-valued state variable, which denotes the significance of the sample at position $[i,j,k]$ in the transposed sub-band. The variable $\sigma[i,j,k]$ is initialized to 0 and toggled to 1 when the corresponding sample's first non-zero bit-plane value is coded. Additionally, a variable $\chi[i,j,k]$ is defined as the sign of that sample, which is 0 when the sample is positive and 1 when the sample is negative.

Zero Coding: When a sample is not yet significant in the previous bit-plane, i.e. $\sigma[i,j,k]=0$, this primitive operation is used to code the new information about the sample. It tells whether the sample becomes significant or not in the current bit-plane. The zero coding operation uses the information of the current sample's neighbors as the context to code the current sample's significance information.

More specifically, the zero coding operation evaluates four categories of a sample's neighbors:
1. Immediate horizontal neighbors. The number of horizontal neighbors that are significant are denoted by the variable "h", where $0 \leq h \leq 2$.
2. Immediate vertical neighbors. The number of vertical neighbors that are significant are denoted by the variable "v", where $0 \leq v \leq 2$.
3. Immediate temporal neighbors. The number of temporal neighbors that are significant are denoted by the variable "a", where $0 \leq a \leq 2$.
4. Immediate diagonal neighbors. The number of diagonal neighbors that are significant are denoted by the variable "d", where $0 \leq d \leq 12$.

Figure 11:
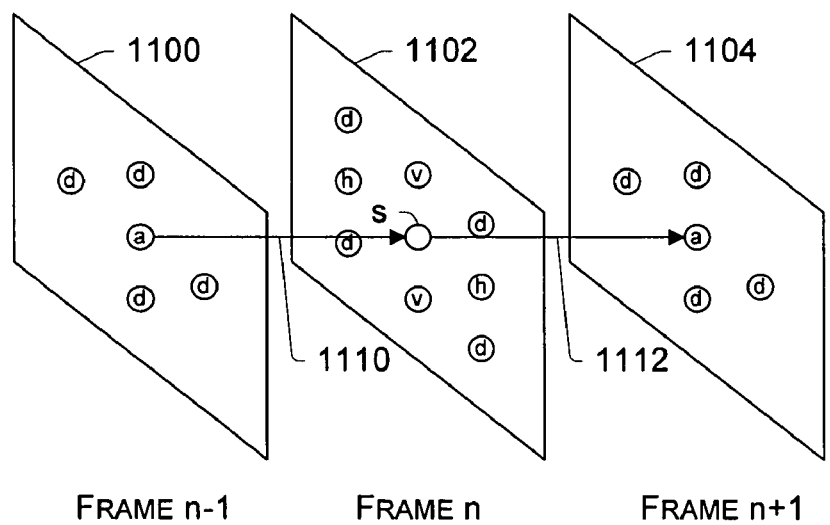
FIG. 11 illustrates three frames to demonstrate how a context for a pixel is determined in terms of neighboring pixels.

FIG. 11 shows the four categories of neighbors in three consecutive frames 1100, 1102, and 1104. A current sample "s" resides in the middle frame 1102. Two horizontal neighbors "h" reside immediately adjacent to the sample "s" in the middle frame 1102. Two vertical neighbors "v" reside immediately above and below the sample "s" in the middle frame 1102. Two temporal neighbors "a" reside immediately before and after the sample "s" in the previous and following frames 1100 and 1104. Twelve possible diagonal neighbors "d" reside diagonally from the sample "s" in all three frames 1100, 1102, and 1104.

It is noted that the temporal neighbors "a" of the sample are not defined as the samples that have the same spatial positions in the previous and next frames. Rather, two samples in consecutive frames are deemed to be temporal neighbors when they are in the same motion trajectory. That is, the temporal neighbors are linked by the motion vectors, as illustrated by vectors 1110 and 1112 in FIG. 11.

Coding efficiency is improved because there is more correlation along the motion direction. The motion vector for a sample in a high level sub-band can be derived from the motion vectors in the low level sub-bands. In spatial decomposition, for example, motion vectors are down-sampled when the wavelet coefficients are down-sampled. Because the range and resolution of the sub-bands are half of the original sub-bands, the magnitude of the motion vectors are divided by two to represent the motion of the samples in that sub-band. If a sample has no correspondent motion vector, a zero motion vector is assigned to the sample.

An exemplary context assignment map for zero coding of the four sub-bands is listed in Tables 1-3. If the conditions of two or more rows are satisfied simultaneously, the lowest-numbered context is selected. An adaptive context-based arithmetic coder is used to code the significance symbols of the zero coding.

TABLES 1-3

Exemplary Context Assignment map for Zero Coding

| LLL and LLH Sub-bands | | | | | LHH Sub-band | | | |
| --- | --- | --- | --- | --- | --- | --- | --- | --- |
| h | v | a | d | Context | h | v + a | d | Context |
| 2 | x | x | x | 0 | 2 | x | x | 0 |
| 1 | $\geq 1$ | x | x | 0 | 1 | $\geq 3$ | x | 0 |
| 1 | 0 | $\geq 1$ | x | 1 | 1 | $\geq 1$ | $\geq 4$ | 1 |
| 1 | 0 | 0 | x | 2 | 1 | $\geq 1$ | x | 2 |
| 0 | 2 | 0 | x | 3 | 1 | 0 | $\geq 4$ | 3 |
| 0 | 1 | 0 | x | 4 | 1 | 0 | x | 4 |
| 0 | 0 | $\geq 1$ | x | 5 | 0 | $\geq 3$ | x | 5 |
| 0 | 0 | 0 | 3 | 6 | 0 | $\geq 1$ | $\geq 4$ | 6 |
| 0 | 0 | 0 | 2 | 7 | 0 | $\geq 1$ | x | 7 |
| 0 | 0 | 0 | 1 | 8 | 0 | 0 | $\geq 4$ | 8 |
| 0 | 0 | 0 | 0 | 9 | 0 | 0 | x | 9 |

| HHH Sub-band | | |
| --- | --- | --- |
| d | h + v + a | Context |
| $\geq 6$ | x | 0 |
| $\geq 4$ | $\geq 3$ | 1 |
| $\geq 4$ | x | 2 |
| $\geq 2$ | $\geq 4$ | 3 |
| $\geq 2$ | $\geq 2$ | 4 |
| $\geq 2$ | x | 5 |
| $\geq 0$ | $\geq 4$ | 6 |
| $\geq 0$ | $\geq 2$ | 7 |
| $\geq 0$ | 1 | 8 |
| $\geq 0$ | 0 | 9 |

Sign Coding: Once a sample becomes significant in the current bit-plane, the sign coding operation is called to code the sign of the significant sample. Sign coding utilizes an adaptive context-based arithmetic coder to compress the sign symbols. Three quantities for the temporal neighbors "a", the vertical neighbors "v", and the horizontal neighbors "h" are defined as follows:

$$h = \min\{1, \max\{-1, \sigma[i-1,j,k]\cdot(1-2\chi[i-1,j,k]) + \sigma[i+1,j,k]\cdot(1-2\chi[i+1,j,k])\}\}$$

$$v = \min\{1, \max\{-1, \sigma[i,j-1,k]\cdot(1-2\chi[i,j-1,k]) + \sigma[i,j+1,k]\cdot(1-2\chi[i,j+1,k])\}\}$$

$$a = \min\{1, \max\{-1, \sigma[i,j,k-1]\cdot(1-2\chi[i,j,k-1]) + \sigma[i,j,k+1]\cdot(1-2\chi[i,j,k+1])\}\}$$

The symbol $\hat{\chi}$ means the sign symbol prediction in a given context. The symbol sent to the arithmetic coder is $\hat{\chi}$ XOR $\chi$. An exemplary context assignment map for sign coding of the four sub-bands is provided in Tables 4-6.

TABLES 4-6

Exemplary Context Assignment map for Sign Coding

| h = −1 | | | | H = 0 | | | |
|---|---|---|---|---|---|---|---|
| v | a | $\hat{\chi}$ | Context | v | a | $\hat{\chi}$ | Context |
| −1 | −1 | 0 | 0 | −1 | −1 | 0 | 9 |
| −1 | 0 | 0 | 1 | −1 | 0 | 0 | 10 |
| −1 | 1 | 0 | 2 | −1 | 1 | 0 | 11 |
| 0 | −1 | 0 | 3 | 0 | −1 | 0 | 12 |
| 0 | 0 | 0 | 4 | 0 | 0 | 0 | 13 |
| 0 | 1 | 0 | 5 | 0 | 1 | 1 | 12 |
| 1 | −1 | 0 | 6 | 1 | −1 | 1 | 11 |
| 1 | 0 | 0 | 7 | 1 | 0 | 1 | 10 |
| 1 | 1 | 0 | 8 | 1 | 1 | 1 | 9 |

| h = 1 | | | |
|---|---|---|---|
| v | a | $\hat{\chi}$ | Context |
| −1 | −1 | 1 | 8 |
| −1 | 0 | 1 | 7 |
| −1 | 1 | 1 | 6 |
| 0 | −1 | 1 | 5 |
| 0 | 0 | 1 | 4 |
| 0 | 1 | 1 | 3 |
| 1 | −1 | 1 | 2 |
| 1 | 0 | 1 | 1 |
| 1 | 1 | 1 | 0 |

Magnitude Refinement: Magnitude refinement is used to code any new information of a sample that has already become significant in the previous bit-plane. This operation has three possible contexts: 0, 1, or 2. The context is 0 if the magnitude refinement operation is not yet used in the sample. The context is 1 if the magnitude refinement operation has been used in the sample and the sample has at least one significant neighbor. Otherwise, the context is 2.

Using the three coding primitive operations—zero coding, sign coding, and magnitude refinement—a sub-band coefficient can be coded without loss. One preferred implementation of the coding operation 1004 is illustrated in FIG. 10 as blocks 1004(1)-1004(6).

At block 1004(1) in FIG. 10, a significant map is initialized to indicate that all samples are insignificant. As an example, a binary value "1" represents that a sample is significant and a binary value "0" represents that a sample is insignificant. Accordingly, following initialization, the significant map contains all zeros.

Then, for each bit-plane and beginning with the most significant bit-plane, the coding procedure makes three consecutive passes. Each pass processes a "fractional bit-plane". The reason for introducing multiple coding passes is to ensure that each sub-band has a finely embedded bitstream. By separating zero coding and magnitude refinement into different passes, it is convenient to design efficient and meaningful context assignment. In each pass, the scanning order is along i-direction firstly, then j-direction, and k-direction lastly.

At block 1004(2), a significant propagation pass is performed. This pass processes samples that are not yet significant but have a "preferred neighborhood", meaning that the sample has at least a significant immediate diagonal neighbor for the HHH sub-band, or at least a significant horizontal, vertical, or temporal neighbor for the other sub-bands. If a sample satisfies these conditions, the zero coding primitive is applied to code the symbol of the current bit-plane for this sample. If the sample becomes significant in the current bit-plane, the sign coding primitive is used to code the sign.

At block 1004(3), a magnitude refinement pass is performed to code those samples that are already deemed to be significant. The symbols of these samples in the current bit-plane are coded by the magnitude refinement primitive given above.

At block 1004(4), a normalization pass is performed to code those samples that are not yet coded in the previous two passes. These samples are considered insignificant, so zero coding and sign coding primitives are applied in the normalization pass.

At block 1004(5), the significant map is updated according to the passes. The updated map reflects the change to those samples that were marked as significant during the passes. Once a sample is identified as significant, it remains significant. This process is then repeated for each bit plane until the least significant bit plane has been coded, as represented by blocks 1004(6) and 1004(7).

Stage 2: Bitstream Construction

In the previous stage of sub-band entropy coding, a bitstream is formed for each sub-band. In the 2D realm, there are seven bitstreams; in the 3-D realm, there are fifteen bitstreams. Afterwards, in the current stage, a final bitstream is constructed by truncating and multiplexing the sub-band bitstreams. The goal is to produce a final bitstream that contains the most effective, yet fewest number, of bits to reduce the amount of data being sent over the network to the receiving client. The bitstream construction takes in consideration that not all decoders will have the same capabilities to decode video. The issue thus becomes how to determine where a bitstream should be truncated and how to multiplex the bitstreams to achieve more functionality (e.g., better PSNR scalability and resolution scalability).

Figure 12:
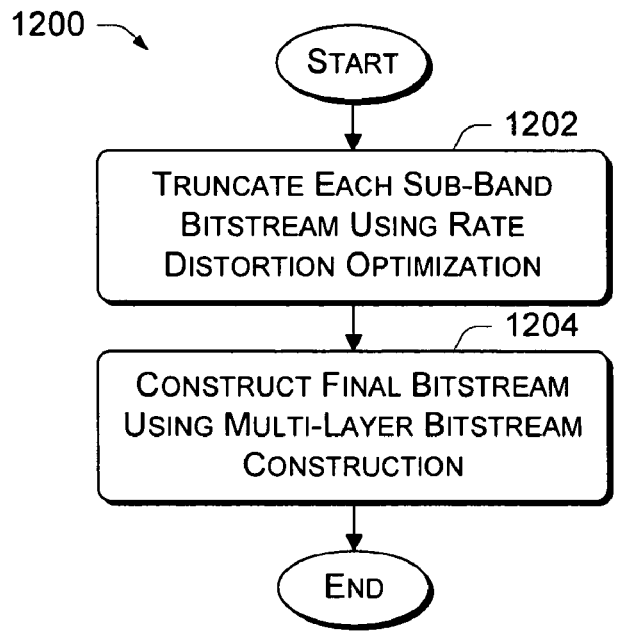
FIG. 12 is a flow diagram of a bitstream construction and truncation process.

FIG. 12 shows an optimal bitstream truncation and construction procedure 1200, which may be implemented by the entropy coder 132 of the video encoder 124 (FIG. 1). At block 1202, the entropy coder truncates each sub-band bitstream using rate distortion optimization. Given a specific bit-rate $R_{max}$, a bitstream can be constructed that satisfies the bit-rate constraint and with minimal distortion. One candidate truncation point is the end of each entropy coding pass. At the end of each pass, the bit length and the distortion reduction is calculated and a value for each candidate truncation point can be plotted to produce an approximate R-D (rate-distortion) curve.

Figure 13:
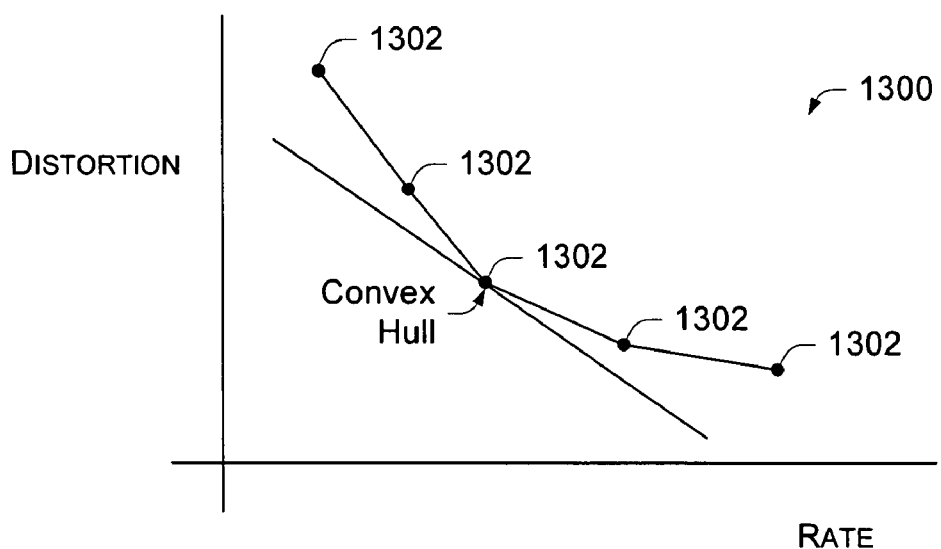
FIG. 13 illustrates a rate-distortion curve that is used in the FIG. 12 process.

FIG. 13 shows an exemplary R-D curve 1300 formed by five candidate truncation points 1302.

The entropy coder locates the convex hull of the R-D curve, and truncation is performed on those candidate truncation points that reside at the convex hull of R-D curve. This guarantees that at every truncation point, the bitstream is rate-distortion optimized. Given a rate-distortion slope threshold λ, one can find truncation points of a sub-band where the rate-distortion slope is greater than λ. To satisfy the bit-rate constraint and to make the distortion minimal, the smallest value of λ such that $R_\lambda \leq R_{max}$ is chosen. One suitable algorithm for finding such a threshold can be found in D. Taubman (editor), "JPEG2000 Verification Model: Version VM4.1," ISO/IEC JTC 1/SC 29/WG1 N1286.

At block 1204, the entropy coder employs a multi-layer bitstream construction technique to form a final multi-layer bitstream containing a quality level's data. To make a N-layer bitstream, a set of thresholds $\lambda_1 > \lambda_2 > \ldots > \lambda_N$ that satisfy $R_{\lambda_N} \leq R_{max}$ are selected. With every threshold, a truncation point is found and a layer of bitstream from each sub-band is obtained. The corresponding layers from all the sub-bands constitute the layers of the final bitstream.

The bitstream construction process offers many advantages in terms of quality scalability, resolution scalability, temporal scalability, and other forms of scalability. The multi-layer bitstream promotes quality scalability in that the client-side decoder 152, depending upon available bandwidth and computation capability, can select one or more layers to be decoded. The fractional bit-plane coding ensures that the bitstream is embedded with fine granularity.

Since each sub-band is coded independently, the bitstream of each sub-band is separable. The decoder 152 can easily extract only a few sub-bands and decode only these sub-bands, making resolution scalability and temporal scalability natural and easy. According to the requirement of various multimedia applications, the final bitstream can be constructed in an order to meet the requirement. To obtain resolution or temporal (frame rate) scalability, for example, the bitstream can be assembled sub-band by sub-band, with the lower resolution or lower temporal sub-band in the beginning. For seven sub-bands illustrated in FIG. 9, the four lower level sub-bands can be coded first, followed by the three higher level sub-bands.

Moreover, the final bitstream can be rearranged to achieve other scalability easily because the offset and the length of each layer of bitstream from each sub-band are coded in the header of the bitstream. This property makes the final bitstream very flexible to be re-used for all sorts of applications without re-encoding again.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An apparatus comprising:
a processor;
a memory, the memory containing instructions that when executed instruct the processor to perform the following acts:
form a pixel array containing a current pixel in a current frame;
determine whether a pixel corresponding to the current pixel resides in a next frame subsequent to the current frame;
if the corresponding pixel exists, add the current pixel to the pixel array;
if the corresponding pixel does not exist, terminate the pixel array with the current pixel;
apply a wavelet transform to the pixel array to produce wavelet coefficients;
apply a spatial 2-D wavelet transform on the wavelet coefficients;
code the wavelet coefficients in bit-planes; and
allocate bits for the bit-planes according to a rate-distortion optimization.

2. An apparatus as recited in claim 1, further comprising instructions to initially indicate all pixels as one state and subsequently changing the state of each pixel after said determining of the pixel.

3. An apparatus as recited in claim 1, further comprising instructions to apply a wavelet transform to the pixel array.

4. An apparatus as recited in claim 1, further comprising instructions to:
apply a 1-D shape-adaptive discrete wavelet transform to the pixel array to produce coefficients;
redistribute the coefficients to corresponding spatial positions in each frame; and
apply a spatial 2-D wavelet transform on the coefficients.

5. A computer-implemented method comprising computer-executable instructions, the method comprising:
estimating motion trajectories of pixels in a video object from frame to frame in a video sequence;
forming a pixel array containing pixels that correspond to one another across multiple frames;
applying a wavelet transform to the pixel array to produce wavelet coefficients and further comprising coding the wavelet coefficients;
coding the wavelet coefficients in bit-planes; and
allocating bits for the bit-planes according to a rate-distortion optimization.

6. A method as recited in claim 5, wherein the applying comprises applying a 3-D wavelet transform to the pixel array.

7. A method as recited in claim 5, wherein the applying comprises:
applying a 1-D shape-adaptive discrete wavelet transform to the pixel array to produce coefficients; and
applying a spatial 2-D wavelet transform to the coefficients.

8. A video encoder comprising:
an estimator to estimate motion trajectories of pixels in a video object from frame to frame in a video sequences;
a transformer to form a pixel array of pixels that correspond to one another across multiple frames and to apply a wavelet transform to the pixel array to produce wavelet coefficients; and
a coder to code the wavelet coefficients in bit-planes and allocate bits for the bit-planes according to a rate-distortion optimization.

9. A video encoder as recited in claim 8, wherein the pixels fall along motion trajectories in a temporal direction from frame to frame.

10. A video encoder as recited in claim 8, wherein the wavelet transformer comprises a 3-D wavelet transformer.

11. A video encoder as recited in claim 8, wherein the wavelet transformer comprises a temporal 1-D wavelet transform and a spatial 2-D wavelet transform.

12. An operating system embodied on a computer-readable memory storage medium comprising a video encoder as recited in claim 8.

13. A video encoder comprising:
means for forming a pixel array containing a current pixel in a current frame;
means for determining whether a pixel corresponding to the current pixel resides in a next frame subsequent to the current frame;

means for applying a wavelet transform to the pixel array to produce wavelet coefficients and further comprising means for coding the wavelet coefficients;

means for coding the wavelet coefficients in bit-planes; and means for allocating bits for the bit-planes according to a rate-distortion optimization; and means for adding the current pixel to the pixel array if the corresponding pixel exists and for terminating the pixel array with the current pixel if the corresponding pixel does not exist.

14. A video encoder as recited in claim 13, further comprising:

means for applying a 1-D shape-adaptive discrete wavelet transform to the pixel array to produce coefficients; and means for applying a spatial 2-D wavelet transform to the coefficients.

15. An operating system embodied on a computer-readable memory storage medium comprising a video encoder as recited in claim 13.

16. A video encoder comprising:

means for estimating motion trajectories of pixels in a video object from frame to frame in a video sequence;

means for forming a pixel array containing pixels that correspond to one another across multiple frames; and means for applying a wavelet transform to the pixel array to produce wavelet coefficients and further comprising means for coding the wavelet coefficients;

means for coding the wavelet coefficients in bit-planes; and means for allocating bits for the bit-planes according to a rate-distortion optimization.

17. A video encoder as recited in claim 16, wherein the applying means comprises means for applying a 3-D wavelet transform to the pixel array.

18. A video encoder as recited in claim 16, wherein the applying means comprises:

means for applying a 1-D shape-adaptive discrete wavelet transform to the pixel array to produce coefficients; and means for applying a spatial 2-D wavelet transform to the coefficients.

19. An operating system embodied on a computer-readable memory storage medium comprising a video encoder as recited in claim 16.

20. A computer-readable memory storage medium comprising computer-executable instructions that, when executed on a processor, direct a device to:

form a pixel array containing a current pixel in a current frame;

determine whether a pixel corresponding to the current pixel resides in a next frame subsequent to the current frame;

if the corresponding pixel exists, add the current pixel to the pixel array; and if the corresponding pixel does not exist, terminate the pixel array with the current pixel;

apply a wavelet transform to the pixel array to produce wavelet coefficients;

code the wavelet coefficients in bit-planes; and allocate bits for the bit-planes according to a rate-distortion optimization.

21. A computer-readable memory storage medium as recited in claim 20, further comprising computer-executable instructions that, when executed on a processor, direct a device to:

apply a spatial 2-D wavelet transform on the wavelet coefficients.

22. A computer-readable memory storage medium as recited in claim 20, further comprising computer-executable instructions that, when executed on a processor, direct a device to:

apply a 1-D shape-adaptive discrete wavelet transform to the pixel array to produce coefficients;

redistribute the coefficients to corresponding spatial positions in each frame; and apply a spatial 2-D wavelet transform on the coefficients.

23. A computer-readable memory storage medium comprising computer-executable instructions that, when executed on a processor, direct a device to:

estimate motion trajectories of pixels in a video object from frame to frame in a video sequence;

form a pixel array containing pixels that correspond to one another across multiple frames; and apply a wavelet transform to the pixel array to produce wavelet coefficients; code the wavelet coefficients in bit-planes; and allocate bits for the bit-planes according to a rate-distortion optimization.

24. A computer-readable memory storage medium as recited in claim 23, further comprising computer-executable instructions that, when executed on a processor, direct a device to:

apply a 1-D shape-adaptive discrete wavelet transform to the pixel array to produce coefficients; and apply a spatial 2-D wavelet transform to the coefficients.

25. A computer-readable memory storage medium as recited in claim 23, further comprising computer-executable instructions that, when executed on a processor, direct a device to:

apply a wavelet transform to the pixel array to produce wavelet coefficients; and code the wavelet coefficients.

* * * * *